United States Patent [19]
Dongieux, Jr. et al.

[11] Patent Number: 5,730,371
[45] Date of Patent: Mar. 24, 1998

[54] DELUMPER

[75] Inventors: Paul A. Dongieux, Jr., St. Joseph, Ind.; Steven J. Anderson; Ricky L. Yoder, both of Brown, Wis.

[73] Assignee: Thermo Fibergen Inc., Waltham, Mass.

[21] Appl. No.: 632,759

[22] Filed: Apr. 16, 1996

Related U.S. Application Data

[63] Continuation of Ser. No. 502,367, Jul. 14, 1995, abandoned, which is a continuation of Ser. No. 182,679, Jan. 14, 1994, abandoned, which is a continuation of Ser. No. 861,268, Mar. 31, 1992, abandoned.

[51] Int. Cl.⁶ ................................................ B02C 19/00
[52] U.S. Cl. ........................... 241/27; 241/28; 162/191
[58] Field of Search ................................. 162/191, 261; 241/27, 28, 278.1; 492/29, 30, 31, 33, 35, 36

[56] References Cited

U.S. PATENT DOCUMENTS

| | | |
|---|---|---|
| 1,842,758 | 1/1932 | Little . |
| 2,195,754 | 4/1940 | Robson et al. . |
| 2,320,944 | 6/1943 | Maginn .................. 29/121.5 X |
| 2,436,555 | 7/1948 | Daniell . |
| 2,457,680 | 12/1948 | Johnson . |
| 2,528,215 | 10/1950 | Doupnik ................. 29/121.6 X |
| 2,581,183 | 1/1952 | Galamb .................. 29/121.7 X |
| 2,589,603 | 3/1952 | Cohen . |
| 2,714,219 | 8/1955 | Qvarnström ............. 29/121.6 X |
| 2,807,989 | 10/1957 | Schaan et al. . |
| 2,858,576 | 12/1958 | Rose . |
| 2,875,799 | 3/1959 | Weems . |
| 3,323,196 | 6/1967 | Renn . |
| 3,880,368 | 4/1975 | Matthew . |
| 4,175,709 | 11/1979 | Fraenkel . |
| 4,289,279 | 9/1981 | Brandt . |
| 4,315,605 | 2/1982 | Vargo, Jr. . |
| 4,721,059 | 1/1988 | Lowe et al. ............... 119/172 |
| 4,734,393 | 3/1988 | Lowe et al. ............... 252/88 X |
| 5,019,564 | 5/1991 | Lowe et al. ............... 71/24 X |

FOREIGN PATENT DOCUMENTS 114731 3/1942 Australia .................. 29/121.6

*Primary Examiner*—Frances Han
*Attorney, Agent, or Firm*—Laff, Whitesel, Conte & Saret, Ltd.

[57] ABSTRACT

A device and a process for delumping pasty masses in waste materials from paper manufacture. The delumping means employs at least one rotating cylindrical drum having a plurality of flexible fingers mounted on the drum. Pasty masses are supplied to the delumper preferably by a chute mounted to the top of the delumper, and are struck by the flexible fingers of the rotating drum. Annular recesses are formed at the base of the flexible fingers which mates with a plurality of bores in the drum housings. Preferably, the fingers are rubber.

13 Claims, 3 Drawing Sheets

DELUMPER

This application is a continuation of application Ser. No. 08/502,367, filed Jul. 14, 1995 which is a continuation of application Ser. No. 08/182,679 filed Jan. 14, 1994 which in turn is a continuation of Ser. No. 07/861,268 filed Mar. 31, 1992, all abandoned.

The present invention relates to the treatment of waste materials and, more particularly, to a means for delumping waste materials containing pasty masses to facilitate their use in the manufacture of useful materials. In one important embodiment, the present invention relates to the treatment of waste materials containing pasty masses produced in the manufacturing of paper and to facilitate the use of those waste materials in producing absorbent materials.

BACKGROUND OF THE INVENTION

Many processes for treating waste materials to make them more manageable and to make them useful in producing new products are known. Such treatment processes have been used in producing new products in the paper industry, for example, to break up broke or trimmings containing pasty masses.

Generally, such processes include a delumping step. The most commonly employed delumping technique involves the use of rotating cylindrical drums of shafts having metal blades or fingers. The rotating drums or shafts are mounted in a housing and the waste material to be treated is passed through the housing, during which it is repeatedly struck, thereby breaking up or delumping the pasty masses by the action of the metal blades or fingers on the rotating drums or shafts.

More recently, a process has been developed for treating moist, pasty masses, produced in the manufacture of paper and paper products, to make a unique new absorbent material. This process, which is disclosed in U.S. Pat. Nos. 4,721,059, 4,734,393 and 5,019,564, requires a delumping step to rid the waste material of the pasty masses.

Although known delumping methods are effective in the treatment of friable by-products, such as paper broke and trimmings, these methods are often ineffective in the treatment of the moist pasty masses because they tend to cake around the metal blades and the fingers of the rotating drums. Once cakes form around the blades and fingers, the delumping process is severely hindered and the pasty masses must be delumped again.

It is an object of this invention to provide a method of delumping pasty masses that prevents the caking problems associated with prior art delumping methods. It is a further object of this invention to provide such a method that uses flexible material impact surfaces.

SUMMARY OF THE INVENTION

In accordance with these and other objectives, a means for delumping moist pasty masses is provided that may be used, for example, in the treatment of waste materials from paper manufacture. The delumping means comprises at least one rotating cylindrical drum or shaft having a plurality of flexible fingers mounted thereon. The drum or shaft is rotatably mounted in a delumper housing.

Pasty masses are passed through the delumper so that they may be repeatedly struck and delumped by the flexible fingers. The constant rotation of the drum or shaft causes continuous flexing and vibration of the flexible fingers, which prevents the moist pasty masses from becoming caked on and around the fingers. In the preferred embodiment, the fingers are rubber and generally cylindrical, and the drums are positioned perpendicularly to the transport line of the pasty masses. The fingers may be mounted to the drum or shaft by annular recesses formed at the base of the fingers which mate with bores formed in the drum.

BRIEF DESCRIPTION OF THE DRAWINGS

The foregoing invention and its advantages may be readily appreciated from the following detailed description of a preferred embodiment, when read in conjunction with the accompanying drawings, in which.

DETAILED DESCRIPTION OF THE PREFERRED EMBODIMENTS

Figure 1:
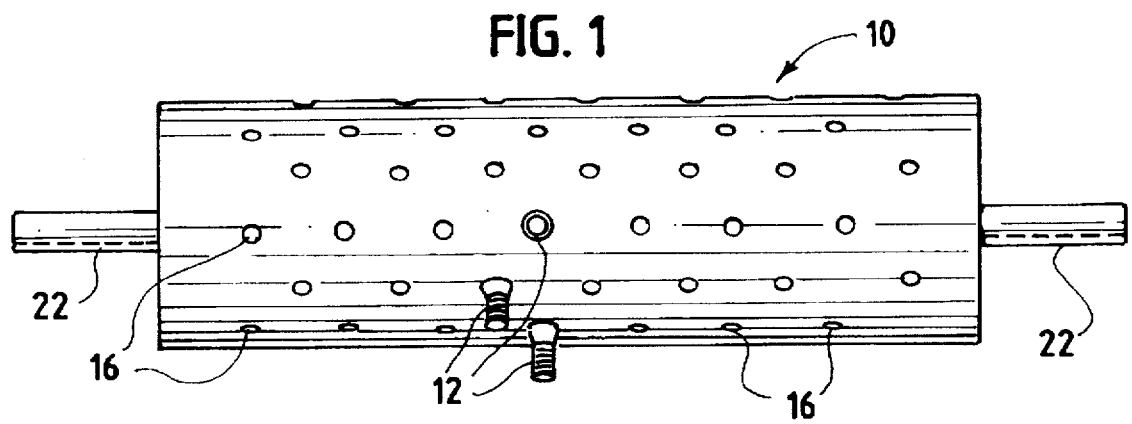
FIG. 1 is a front plan view of a drum incorporating a plurality of flexible fingers in accordance with the delumping method of this invention.
Figure 2:
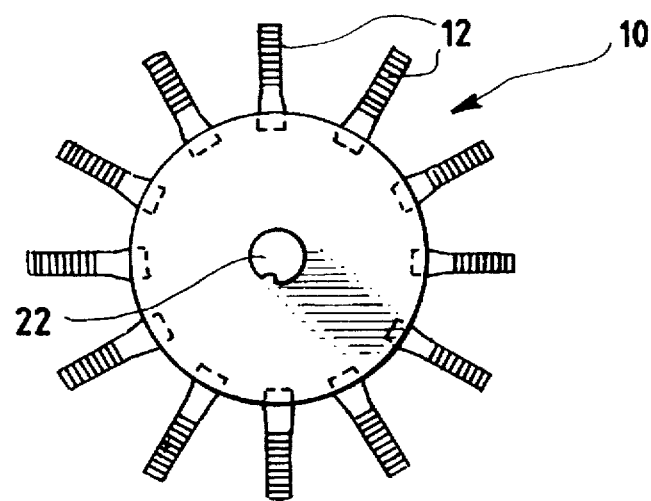
FIG. 2 is a cross section taken along lines 2—2 of FIG. 1.
Figure 3:
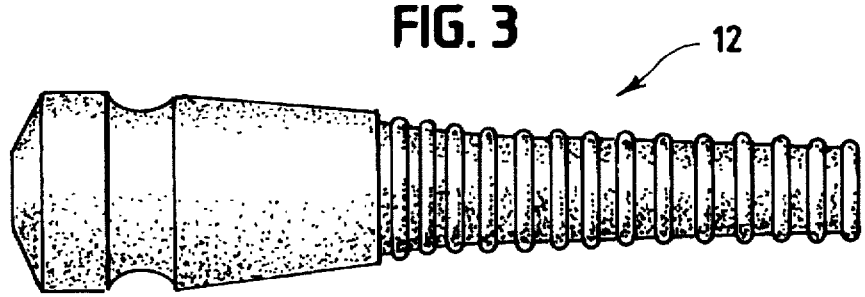
FIG. 3 is a perspective view of one of the flexible fingers shown in FIGS. 1 and 2.

The delumping method of the present invention employs at least one cylindrical drum 10 constructed of metal, plastic, or other rigid material having a plurality of flexible members attached thereto. If desired, a cylindrical shaft may be used in lieu of the drum. In the preferred embodiment shown in FIGS. 1 and 2, the flexible members are in the form of a plurality of flexible rubber fingers 12 attached to drum housing 10. The size, configuration and type of flexible member employed may vary depending on the type of pasty masses to be delumped and the feed and output parameters of the system.

Fingers 12 may be substantially cylindrical or rectangular and they may taper from their bases to their distal ends. Also, fingers 12 may have ridges. In addition, although the fingers must be flexible, they need not be solid, and may, for example, be in the form of a hollow wound spring. Fingers 12 may be mounted to drum 10 in any suitable manner. In the illustrated embodiment, annular recesses 16 formed on the fingers engage bores 18 formed on the drum housing.

Figure 4:
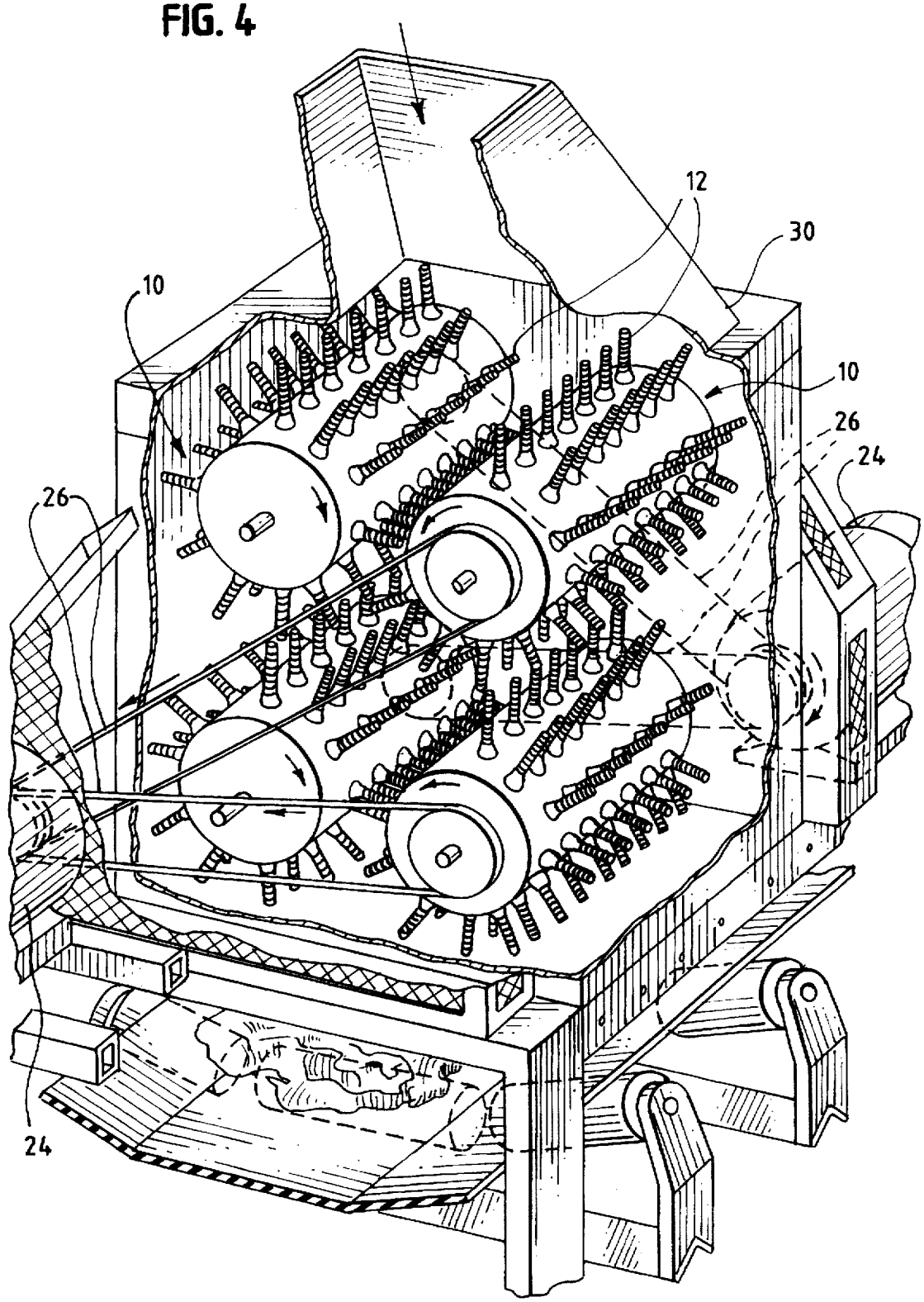
FIG. 4 is a perspective view of the inside of a delumper in accordance with the invention incorporating a plurality of drum housings.
Figure 5:
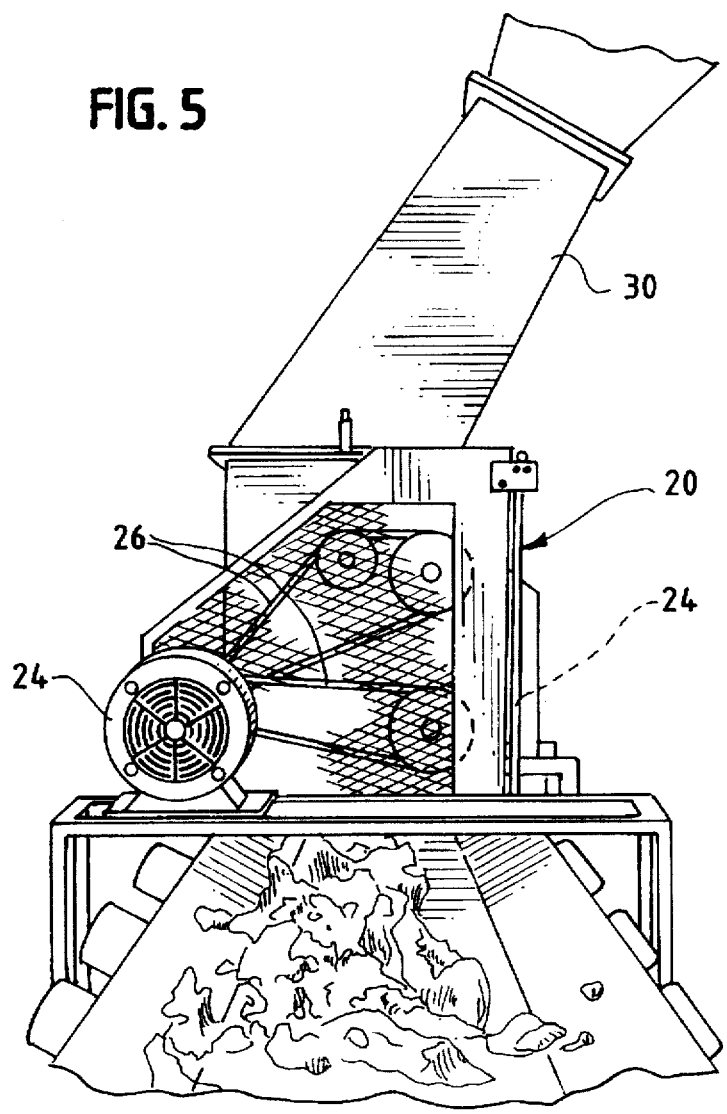
FIG. 5 is a side view of the delumper of FIG. 4.

In the preferred embodiment, a plurality of drums 10 are rotatably mounted in a delumper housing 20 by central shafts 22, which are integral with the drum. The specific number of drums 10 employed may vary depending upon the volume of pasty masses to be delumped, i.e. the higher the volume the more drums employed. Preferably, the drums extend in the longitudinal direction, as shown in FIGS. 4 and 5, and the pasty masses are delivered to delumper 20 through a chute 30 mounted to the top of the delumper. Shafts 22 are rotatably driven in any suitable manner such as by one or more motors 24 and corresponding drive belts 26, as shown in FIGS. 4 and 5. Shafts 22 and drums 10 may rotate at any desired speed, depending on the desired throughput of the unit and the nature of the pasty masses. Preferably, however, the shafts and drums are driven at a speed in the range of 30 to 120 revolutions per minute.

Figure 6:
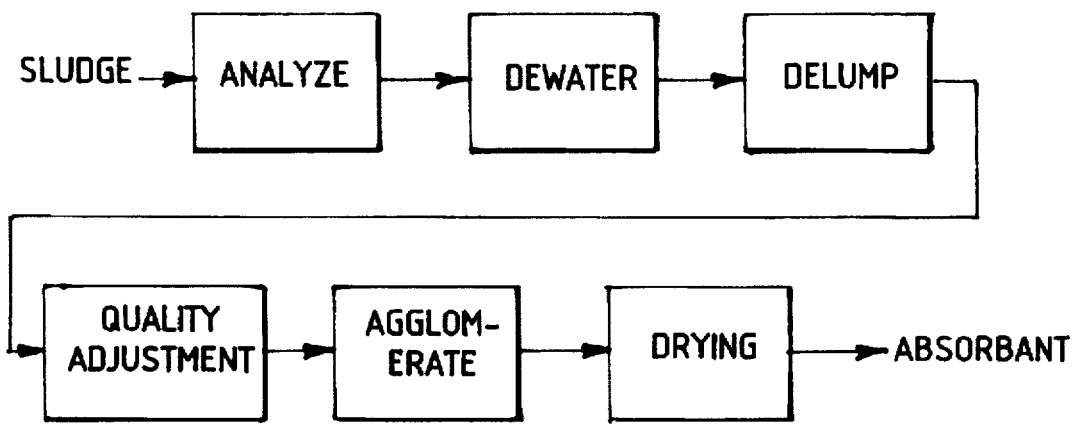
FIG. 6 is a schematic diagram of the process for treating pasty masses employing the method for delumping pasty masses in accordance with the invention.

An exemplary process for treating pasty masses that employs the delumping method of this invention is set forth schematically in FIG. 6. As shown there, pasty masses in a paper industry waste stream are analyzed for bacteria and to determine their wood, fiber and filler composition. The masses then are delivered to the delumper through chute 30. As the masses drop from chute 30 and pass through the delumper, flexible fingers 12 of the rotating drums 10 strike and delump the material. Due to the rotation of drums 10, flexible fingers 12 are constantly flexing and vibrating which prevents the pasty masses from becoming caked on the fingers. After being delumped, the pasty masses drop onto a conveyor where they are mixed with appropriate additives.

The pasty masses are then agglomerated or granulated by conventional means using, for example, a drum pelletizer, a disk pelletizer, a pinmill, an extruder or a granulator. The pasty masses are then formed into spherical pellets or, preferably, granule shapes. Should spherical pellets be formed, they are flattened into a granular shape by a standard compaction device.

The product is then dried until the granules contain 1%–10% moisture by weight. Drying is accomplished at a temperature of about 200° to 750° F. in a conventional dryer such as a fluid bed dryer, a turbo dryer, a belt dryer or a tray dryer. After drying, color may be added. The product is then packaged and sold as an absorbent or similar product.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A method of delumping pasty masses comprising:

supplying the pasty masses to a delumper having mounted therein at least one rotating cylindrical drum and a plurality of non-metallic flexible fingers mounted to the drum so that the flexible fingers continuously flex and vibrate as the drum rotates; and striking the pasty masses with the continuously flexing and vibrating flexible fingers mounted to said at least one rotating cylindrical drum.

2. The method of claim 1 wherein said flexible fingers are constructed of rubber.

3. The method of claim 1 wherein said pasty masses are supplied to said delumper through a chute mounted to the top of said delumper.

4. The method of claim 1 wherein said at least one drum is rotating at a speed in the range of about 30 to 120 revolutions per minute.

5. A method of delumping pasty masses comprising striking the pasty masses with a plurality of rubber flexible fingers while continuously flexing and vibrating said plurality of flexible fingers, each of said flexible fingers being of one-piece construction and tapering from its base to its distal end.

6. The method of claim 5 wherein the flexible fingers are mounted to a shaft which rotates on a fixed axis.

7. The method of claim 5 wherein said flexible fingers have ridges to facilitate their continuous flexing and vibrating.

8. A method of delumping pasty masses comprising mounting non-metallic, flexible fingers to a cylinder adapted to rotate on a fixed axis, rotating the cylinder to continuously flex and vibrate the flexible fingers while feeding the pasty masses to the rotating flexible fingers in a direction generally perpendicular to said cylinder axis; and continuously striking the pasty masses with said flexible fingers until the pasty masses are effectively delumped.

9. The method of claim 8 wherein said flexible fingers are each tapered from its base to its distal end and constructed of rubber and wherein said flexible fingers continuously flex and vibrate as said cylinder rotates and said flexible fingers strike the pasty masses thereby preventing the pasty masses from becoming caked on and around said flexible fingers.

10. The method of claim 8 wherein each of said flexible fingers has a circular cross-section.

11. The method of claim 8 wherein said flexible fingers have ridges to facilitate their continuous flexing and vibrating.

12. A method of treating pasty masses from paper industry waste streams to remove undesirable lumps and form agglomerated granules comprising:

delivering the pasty masses to a plurality of continuously flexing and vibrating flexible fingers which strike the pasty masses until a delumped product is produced;

mixing the delumped product with appropriate additives;

agglomerating to produce granule shapes; and drying the granule shapes.

13. The method of claim 12 in which said continuously flexing and vibrating flexible fingers are mounted to a cylinder rotating on a fixed axis and the pasty masses are delivered to said rotating flexible fingers in a direction generally perpendicular to said cylinder axis.

\* \* \* \* \*